US008005849B2

(12) United States Patent
Parkinson et al.

(10) Patent No.: US 8,005,849 B2
(45) Date of Patent: Aug. 23, 2011

(54) DATABASE ACCESS SERVER WITH REFORMATTING

(75) Inventors: Steven W. Parkinson, San Jose, CA (US); Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 11/469,421

(22) Filed: Aug. 31, 2006

(65) Prior Publication Data

US 2008/0059396 A1  Mar. 6, 2008

(51) Int. Cl.
  *G06F 17/30* (2006.01)
(52) U.S. Cl. ........................ 707/756; 713/182
(58) Field of Classification Search ............. 707/756
  See application file for complete search history.

(56) References Cited

U.S. PATENT DOCUMENTS

| | | | |
|---|---|---|---|
| 5,557,780 A * | 9/1996 | Edwards et al. ............... 703/27 |
| 5,983,020 A * | 11/1999 | Sweeney et al. ............. 717/141 |
| 6,182,149 B1 * | 1/2001 | Nessett et al. ................ 709/247 |
| 6,336,186 B1 * | 1/2002 | Dyksterhouse et al. ....... 713/156 |
| 6,418,446 B1 | 7/2002 | Lection et al. |
| 6,502,075 B1 * | 12/2002 | Terry et al. .................. 704/275 |
| 6,633,872 B2 * | 10/2003 | Ambrosini et al. .............. 707/9 |
| 6,635,089 B1 | 10/2003 | Burkett et al. |
| 6,785,686 B2 * | 8/2004 | Boreham et al. ............. 707/102 |
| 6,850,928 B1 | 2/2005 | McClure et al. |
| 7,243,341 B2 * | 7/2007 | Murray ......................... 717/136 |
| 2002/0002625 A1 * | 1/2002 | Vange et al. .................. 709/246 |
| 2002/0083087 A1 * | 6/2002 | Deuser et al. ................. 707/500 |
| 2002/0137852 A1 * | 9/2002 | Sasaki et al. .................. 525/274 |
| 2005/0137852 A1 * | 6/2005 | Chari et al. ...................... 704/7 |
| 2007/0288459 A1 * | 12/2007 | Kashiyama et al. ............ 707/6 |

OTHER PUBLICATIONS

Chavan et al., "AIX and Linux Interoperability", 2003, Redbooks.*
Adam Williams, "LDAP and OpenLDAP (on the Linux Platform)", 2001.*
Brad Marshall, "Introduction to LDAP", Oct. 2001.*
Yeong, W., Howes, T. and Kille, S., Lightweight Directory Access Protocol, Mar. 1995, RFC 1777.
Wahl, M., Howes, T., and Kille, S., Lightweight Directory Access Protocol (v3), Dec. 1997, RFC 2251, Copyright (C) The Internet Society (1997).
Wahl, M., Coulbeck, A., Howes, T., and Kille, S., Lightweight Directory Access Protocol (v3): Attribute Syntax Definitions, Dec. 1997, RFC 2252, Copyright (C) The Internet Society (1997).
Wahl, M., A Sumary of the X.500(96) User Schema for use with LDAPv3, Dec. 1997, RFC 2256, Copyright (C) The Internet Society (1997).
Wahl, M. and Howes, T., Use of Language Codes in LDAP, May 1999, RFC 2596, Copyright (C) The Internet Society (1999).
Red Hat Linux 9: Red Hat Linux Reference Guide, 2003, Raleigh, NC.
Thompson, Dan, Understanding LDAP, Jul. 2000, Microsoft Corporation, Redmond, WA.

* cited by examiner

*Primary Examiner* — Shahid A Alam
*Assistant Examiner* — Dawaune Conyers
(74) *Attorney, Agent, or Firm* — Lowenstein Sandler PC

(57) ABSTRACT

A database access server includes a network interface device and a processing device coupled to the network interface device via a bus. The network interface device receives a data request. The processing device retrieves data having a first data type. The processing device further reformats the retrieved data to create reformatted data having a second data type, and sends the reformatted data in response to the data request.

24 Claims, 3 Drawing Sheets

DATABASE ACCESS SERVER WITH REFORMATTING

TECHNICAL FIELD

Embodiments of the present invention relate to data processing, and more specifically to a database access server with reformatting.

BACKGROUND

A database may be used to store items of information in a manner that permits a particular item to be accessed efficiently. The database and the mechanism to retrieve items from the database may be part of a database server. The mechanism to accept requests for items in the database from a user and to display requested items to the user may be part of a client.

The database server and the client may each be a process that is carried out by a machine such as a computer. The database server and the client may be processes on the same machine or they may be processes on separate machines that are communicatively coupled. Either or both of the database server and the client processes may be carried out by a plurality of machines that are communicatively coupled.

A database access server may be used to communicatively couple a client and a database server. The database access server may allow the client to access the database server without knowing the implementation of the database server. The database access server may allow the client to access a plurality of database servers as though they were a single database server.

The database access server may be a process that is carried out by a machine such as a computer. The database access server may be a process on the same machine as the database server or it may be a process on a separate machine that is communicatively coupled to the one or more machines providing the database server. The database access server may communicatively couple the client server to the database server.

An exemplary database server is a Lightweight Directory Access Protocol (LDAP) directory server. LDAP is a set of open protocols used to access centrally stored information over a network. It is based on the X.500 standard for directory sharing, but is less complex and resource intensive. Like X.500, LDAP organizes information in a hierarchal manner using directories. These directories can store a variety of information and can enable access to the information from any machine on the LDAP enabled network.

The LDAP server can use a variety of databases to store a directory, each optimized for quick and copious read operations. When an LDAP client application connects to an LDAP server, it can either query a directory or attempt to modify it. In the event of a query, the server either answers the query or, if it can not answer locally, it can refer the query to an LDAP server which does have the answer. If the client application is attempting to modify information in an LDAP directory, the server verifies that the user has permission to make the change and then adds or updates the information.

The main benefit of using LDAP is that information for an entire organization can be consolidated into a central repository. LDAP supports a number of back-end databases in which to store directories. This allows administrators the flexibility to deploy the database best suited for the type of information the server is to disseminate. Because LDAP has a well-defined client Application Programming Interface (API), the number of LDAP-enabled applications are numerous and increasing in quantity and quality.

Information stored in the database is stored in one or more defined formats. A client may request a particular item from the database with a particular format. If the requested item is not available with the requested format, the request fails.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
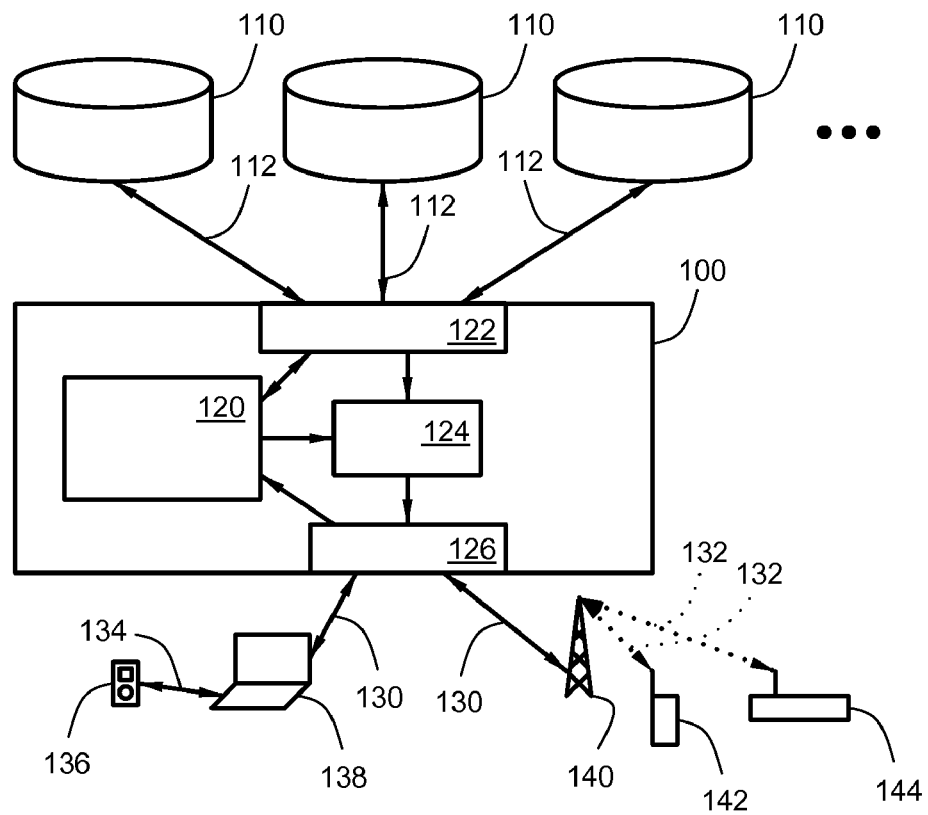
FIG. 1 is a block diagram of a system in which embodiments of the invention may operate.

Embodiments of a database access server with a data reformatter are described herein. A database access server may receive a data request. In response, the database access server may retrieve data having a first data type. A data reformatter of the database access server may reformat the retrieved data to create reformatted data having a second data type. The database access server may then send the reformatted data to a client in response to the data request. In one embodiment, the second data type is provided with the data request. In some embodiments, the database access server may be a Lightweight Directory Access Protocol (LDAP) directory server, the data request may identify data to be retrieved using an LDAP attribute, and the second data type may be represented as an LDAP subtype for the attribute.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

The presently disclosed system and method can be implemented using hardware, software or a combination of hardware and software. Specifically, the disclosed system and method can be implemented using either object-oriented programming languages, like the Java and C++ programming languages, or procedural programming languages such as the C programming language. The disclosed system and method can be implemented using a computer system with a single personal computer or a network of multiple computers.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium, which may also be referred to as a computer readable medium, includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; etc.

Reference will now be made in detail to exemplary embodiments of the disclosed system which are also illustrated in the accompanying drawings. Although the description includes exemplary embodiments, it can be easily seen that other embodiments are possible, and changes can be made to the embodiments described without departing from the spirit of the disclosed system and method.

FIG. 1 shows a database access server 100 communicatively coupled to a plurality of database servers 110 by data access links 112. The database access server 100 may be a process that is executed by a general purpose computer or by a specialized processor. The database access server 100 may be provided by a dedicated device or it may be provided by a device that provides other services as well, possibly including one or more of the database servers 110.

The database access server 100 may include a client interface 126 with client input ports and client output ports. The client ports may be coupled to a variety of client devices 136, 138, 142, 144 by network connections 130, 132, such as an Internet connection. The network connections may be wired 130 or wireless 132. The wireless connections may be provided by a wireless gateway 140 that is coupled to the client interface 126 by a wired connection 130. Client devices 136 may be connected to the client interface 126 indirectly by a link 134 to another client device 138 that serves as a gateway to the database access server 100. Client devices 136 through 144 may include personal computers, personal digital assistants (PDAs), cellular telephones, and similar devices.

A client input port in the client interface 126 of the database access server 100 may receive a data request for an item. The data request may include a data identifier to identify the desired item to be retrieved from the database server 110. The data request may further include a requested data type to indicate the desired data type for the item to be retrieved. The database access server 100 may receive the data request using a Lightweight Directory Access Protocol (LDAP).

Figure 2:
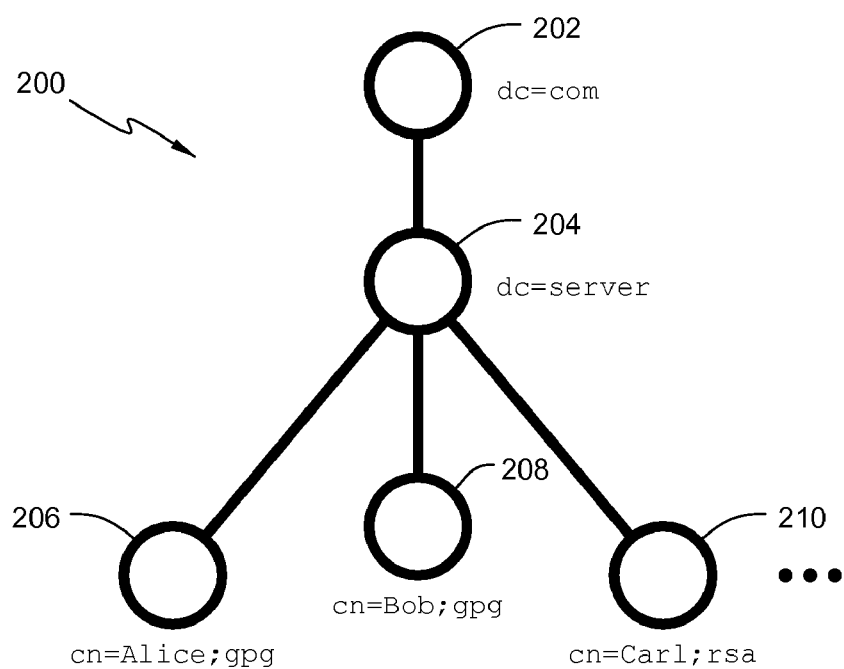
FIG. 2 is a schematic representation of a directory that may be used with some embodiments of the invention.

As shown in FIG. 2, LDAP represents a database as a directory that is a tree 200 of directory entries 206, 208, 210. An entry consists of a set of attributes. An attribute has a name, which is an attribute type or attribute description, and one or more values. An attribute may have a subtype. The attributes are defined in a schema.

Each entry has a unique identifier, its Distinguished Name (DN). The DN is the identifier of the entry and not an attribute nor part of the entry. The DN may be composed of a number of parts that indicate where the directory entry is placed in the directory tree 200. For example, an entry 210 for Carl may have the following DN:

dn: cn=Carl, dc=server, dc=com

"Carl" may be the Relative Distinguished Name (RDN) of the database entry 210; "server" 204 and "com" 202 may be domain components (DC) of the DN.

In some embodiments, the data identifier indicating the item to be retrieved may be represented in an LDAP attribute. A requested data type indicating the desired format of the item to be retrieved may be represented in an LDAP subtype for the LDAP attribute. For example, an LDAP request for an encrypted file to be retrieved from an entry may have an LDAP attribute and subtype as follows:

fileName; encryptionType

The value, "fileName", for the "file" attribute may give the name of the file in the entry. In other cases, the value may be some other form of locater for the file. The subtype, "encryptionType", indicates the encryption type to be retrieved for the file in the entry.

There may be a default data type for retrieved data items. The default type may be returned when no data type is provided in the data request. In some embodiments, a data request may not permit the inclusion of a requested data type and the default data type may be returned unconditionally.

By storing only one copy of the data and dynamically building other variants on-the-fly, data storage in the database server is reduced. For example, the database server 100 may store attributes in a compressed form with subtype "gz" as follows:

jobdescription-longform;gz: <long binary encoded stream>

If a client asks for a subtype-less attribute 'jobdescription-longform', the database access server 100 server would read in the data from the ";gz" subtype, dynamically decompress it and return it to the user. To the user, it appears that the content exists in both the 'jobdescription-longform' and 'jobdescription-longform;gz' attributes. In one embodiment, the database access server 100 further includes control logic 120 and a reformatter 124. The control logic 120 receives a data request identifying a desired data item and a desired data type. The control logic 120 sends the request to the database server 110 to locate and retrieve the requested item without regard to the requested data type. The database access server 100 retrieves the data over a data access link 112 that communicatively couples the database access server and the database server 110. With the retrieved data, the database access server 100 retrieves an initial data type that indicates the present data format of the retrieved data.

If the initial data type is not the same as the requested data type, or the default data type if the request does not include a data type, the control logic 120 directs the reformatter 124 to reformat the retrieved data. The reformatted data is sent to a client output port in the client interface 126 to be transmitted to the client in response to the data request. If the initial data type is the same as the requested data type, the control logic 120 sends the retrieved data directly to the client output port.

The reformatter 124 may provide a plurality of format translations. This may include a plurality of translations for a particular class of data types, as well as a plurality of classes of data types. The classes of data types may include, for example, encryption, compression, language, etc. The encryption data types may include, for example, GNU Privacy Guard (GPG), Rivest-Shamir-Adleman (RSA), etc. The compression data types may include, for example, GNU zip (gz), LZMA compression algorithm (lzma), BZIP2 (bz2), etc. The language data types may include, for example, natural language types such as English, French, German, and so on.

The data translation may be carried out by selecting a data format processor according to the initial data type indication returned with the retrieved data. In one embodiment, a first data format processor is selected to transform a data item in the initial data format into a standard data format (e.g., plain text format), and then a second data format processor is selected to transform the data item in the standard data format into the requested data format.

In one embodiment, the standard data type for the requested data is a default data type that is sent to the client unconditionally. In another embodiment, the standard data type for the requested data is sent to the client if the client does not include a data type in the data request.

In one embodiment, the second data format processor is selected according to the requested data type provided in the data request. The output of the second data format processor may be the reformatted data to be transmitted to the requesting client. The initial data type of the retrieved data may be a pointer to the appropriate data format processor for creating a standard format from data formatted according to the initial data type. The requested data type may be a pointer to a second appropriate data format processor for creating data formatted according to the requested data type from the standard format.

In some embodiments, it may be possible for the data reformatter to directly translate data from the first format to the second format without the use of a standard format as an intermediary. For example, an embodiment for providing requested files in a requested language type may include a data reformatter that translates directly between supported language pairs. In another exemplary embodiment, all the files are stored in the same data format and it is not necessary to translate the retrieved files into a standard data format before they are sent to the data format processor chosen according to the requested data format.

An exemplary system using the invention could be a system for delivering files stored in an encrypted format to clients. The files could be maintained by a database server in which each file is maintained as an element of an item in the database. Each item could include identifying tags to allow the desired file to be retrieved from the database.

The files may be encrypted to protect the stored files from theft or compromise. In one embodiment, all files may be stored in the same encrypted format. In another embodiment, the files may be stored in a variety of encrypted formats (e.g., if the files are aggregated from a variety of sources). For example, the files may be provided by a plurality of database servers 110 and each database server may use a different form of encryption.

A database entry 210 including an encrypted file might appear in part as follows using LDAP Data Interchange Format (LDIF) for representing LDAP directory content:

```
dn: cn=Carl,dc=server,dc=com
cn: Carl
  :
file;rsa: <encrypted binary data>
  :
```

In one embodiment, data stored in the database in a plain text format may be automatically returned to clients in an encoded format. Alternatively, data stored in the database in an encoded format may be automatically returned to clients in a plain text format.

In some embodiments, client devices may require that files be delivered with specific data types as supported by the client device. The data type may be selected for efficient processing by the client device and/or efficient delivery over the connection to the database access server. In the exemplary system, it may be desirable to use a data type that provides a more secure format than the encryption type of the files stored in the database. For example, it may be desirable to use a different encryption type if the data is to be delivered over an insecure communication link, such as a wireless Internet link.

Because of the variety of data types required by client devices, which may vary depending on the operating mode of the client device, it may not be practical for the database access server to determine what file format is appropriate for delivery to the client device. Hence, in one embodiment, the client device is allowed to request the data type for the file to be sent by the database access server to the client device.

Referring to FIG. 1, a client 136 may request an attribute using an LDAP Universal Resource locater (URL). For example, the client may have identified that a desired file is in the entry having the following DN:
 dn: cn=Carl, dc=server, dc=com
The client may request the "Carl" file with Advanced Encryption Standard (AES) encryption using the following LDAP URL:
 ldap://ldap.server.com/cn.=Carl,
 dc=server, dc=com?file; aes
The database access server 100 receives the LDAP URL as a data request. The LDAP attribute, Carl.rsa, provides a data identifier. The subtype, aes, indicates the encryption type being requested. It will be appreciated that while the example file name includes an extension of rsa that presumably identifies the encryption type of the file as being encrypted with the Rivest-Shamir-Adleman (RSA) algorithm, it is not necessary for the attribute to provide an indication of the encryption type.

The control logic 120 of the database access server 100 retrieves data having the data identifier from the database server 110. The control logic 120 receives an indication of the encryption type of the retrieved data from the database server 110.

The control logic 120 causes the retrieved data, which is encrypted according to a first compression type, to be reformatted by the reformatter 124. The reformatter 124 decrypts the retrieved data using the first encryption type, and then encrypts it according to a requested second encryption type. The reformatted data is transmitted to the requesting client 136 in response to the data request.

Figure 3:
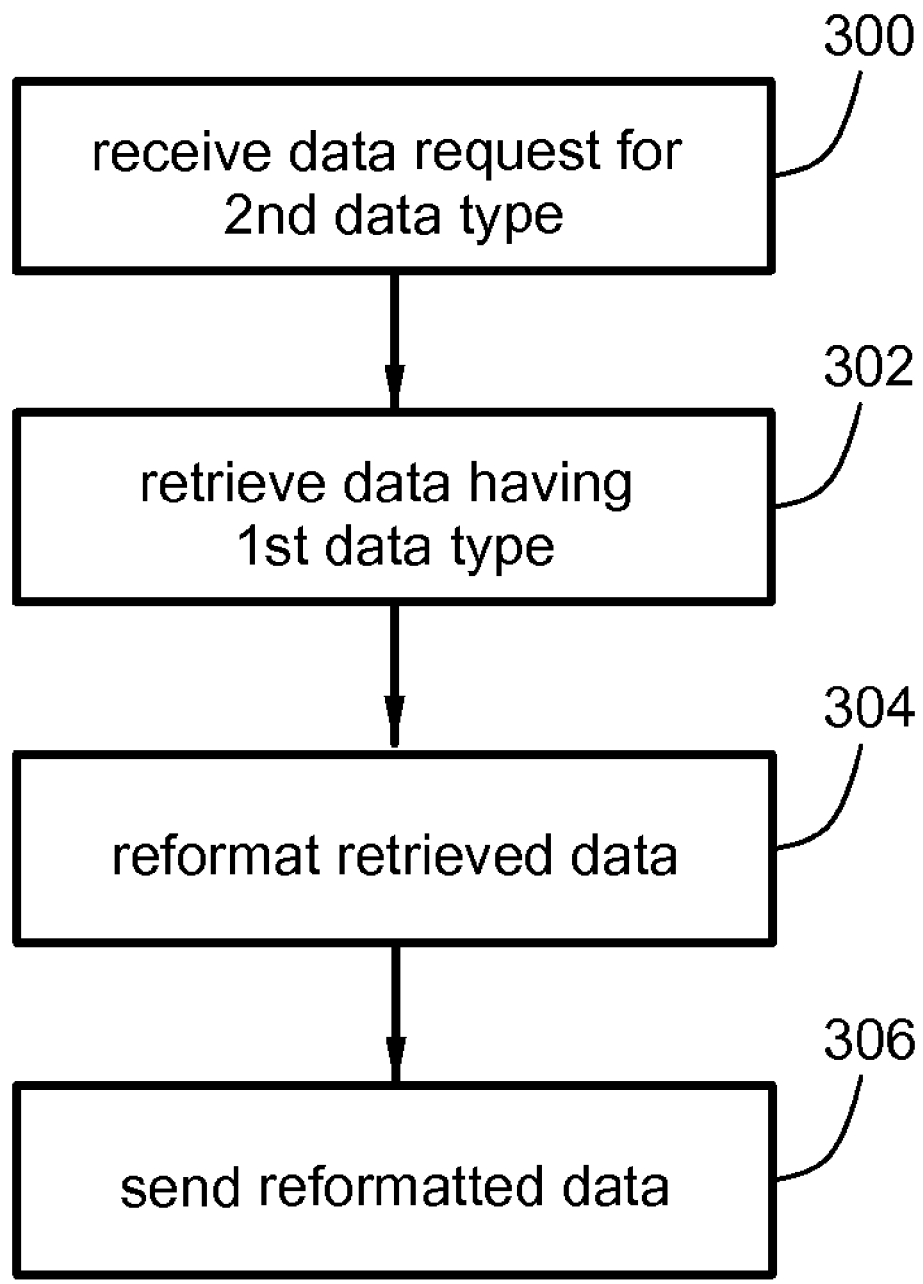
FIG. 3 is a flowchart of one embodiment of a method for providing data in a requested compression format.

FIG. 3 is a flowchart for a method for processing data requests that embodies the invention. The method may be performed by processing logic that may comprise hardware (e.g., circuitry, dedicated logic, programmable logic, microcode, etc.), software (such as instructions run on a processing device), or a combination thereof. In one embodiment, the method is performed by a database access server 100 of FIG. 1.

A data request that includes a data identifier and a second data type is received at block 300. At block 302, data having the data identifier and a first data type is retrieved. The retrieved data is reformatted to create reformatted data according to the second data type (block 304). The reformatted data is sent in response to the data request (block 306).

Figure 4:
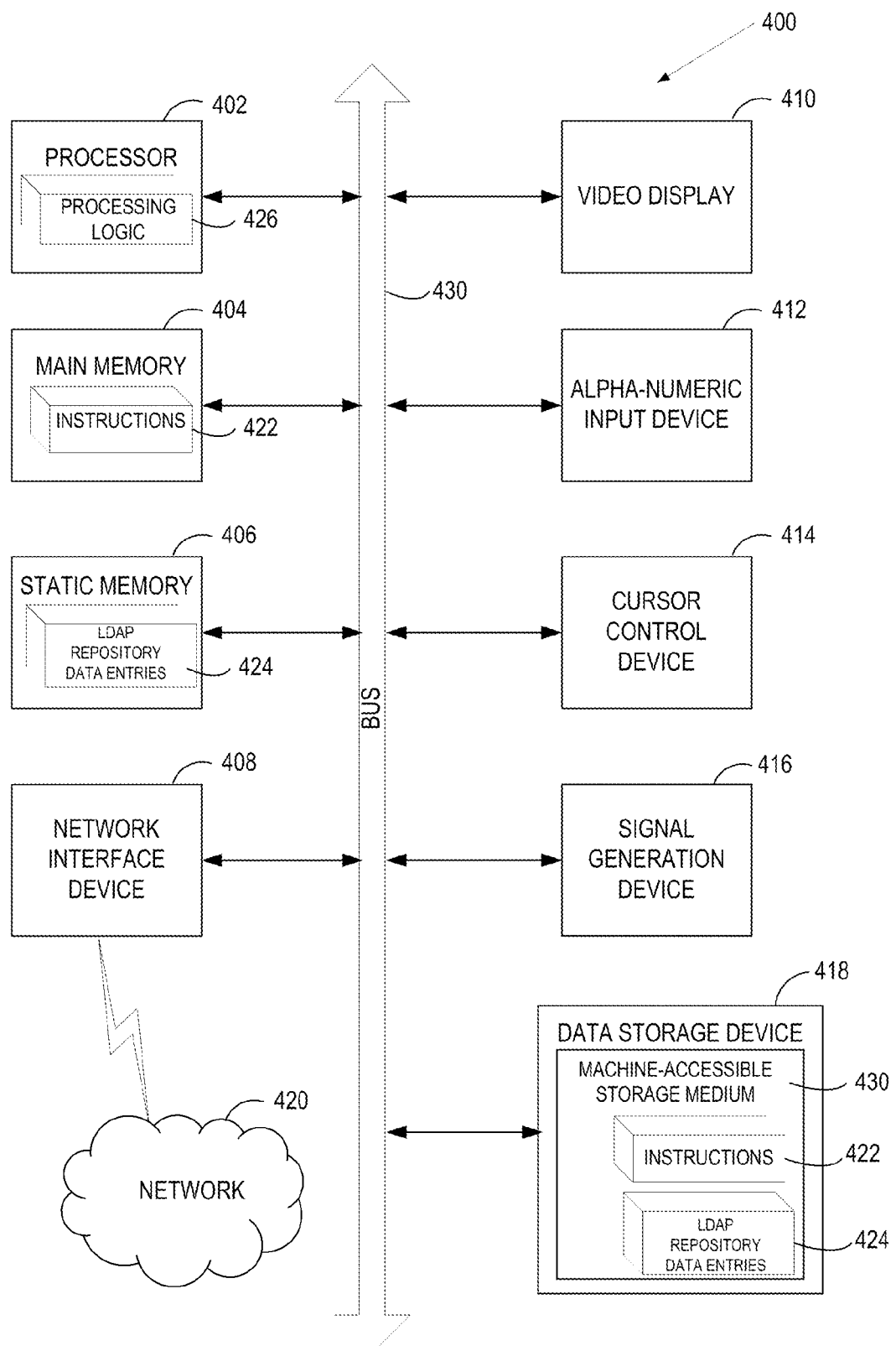
FIG. 4 illustrates a block diagram of an exemplary computer system implementing some embodiments of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store LDAP repository data entries 424. LDAP repository data entries 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A database access server comprising:
   data storage to store a Lightweight Directory Access Protocol (LDAP) data repository that stores a single copy of a value for a data attribute, the value being associated with a subtype identifier that indicates the value being stored with a first data type that belongs to one of a plurality of classes of data types including encryption, compression, and language, the database access server to dynamically build other variants of the data attribute in response to one or more requests to produce values associated with data types that are different from the first data type and belong to a same class as the first data type;
   a network interface device to receive a data request from a client for the value of the data attribute having a second data type, the data request compliant with the LDAP; and
   a processing device, coupled to the data storage and the network interface device via a bus, including a plurality of data format processors each to provide data translations for the plurality of classes of data types including encryption, compression, and language, wherein the processing device is configured to:

retrieve, from the data storage, the value of the data attribute having the first data type in response to the data request, the first data type comprising a first pointer to a first data format processor of the plurality of data format processors for creating data in a standard format from the data retrieved, reformat, in response to a determination made by the processing device that the first data type is not the same as the second data type, the retrieved data to create reformatted data having the second data type, the second data type comprising a second pointer to a second data format processor of the plurality of data format processors for creating the reformatted data in the second data type from the data in the standard format, and send the reformatted data to the client in response to the data request, such that it appears to the client that the value of the data attribute having the second data type exists in the data storage.

2. The database access server of claim 1 wherein one of the first and second data types is compressed and the other one of the first and second data types is uncompressed.

3. The database access server of claim 1 wherein one of the first and second data types is encrypted and the other one of first and second data types is plaintext.

4. The database access server of claim 1 wherein the data request includes an indication of the second data type.

5. The database access server of claim 4 wherein the first data type is compressed with a first type of compression, and the second data type is compressed with a second type of compression.

6. The database access server of claim 4 wherein the first data type is encrypted with a first type of encryption, and the second data type is encrypted with a second type of encryption.

7. The database access server of claim 4 wherein the first data type is expressed in a first language, and the second data type is expressed in a second language.

8. The database access server of claim 1 wherein the second data type is a default data type when the data request does not indicate a data type.

9. A method for processing data requests comprising:

storing, in a data storage, a Lightweight Directory Access Protocol (LDAP) data repository that stores a single copy of a value for a data attribute, the value being associated with a subtype identifier that indicates the value being stored with a first data type that belongs to one of a plurality of classes of data types including encryption, compression, and language, other variants of the data attribute being dynamically built in response to one or more requests to produce values associated with data types that are different from the first data type and belong to a same class as the first data type;

receiving, by a network interface device, a data request from a client for the value of the data attribute having a second data type, the data request compliant with the LDAP;

retrieving, from the data storage by a processing device that includes a plurality of data format processors each to provide data translations for the plurality of classes of data types including encryption, compression, and language, the value of the data attribute having the first data type in response to the data request, the first data type comprising a first pointer to a first data format processor of the plurality of data format processors for creating data in a standard format from the data retrieved;

reformatting, by the processing device in response to a determination made by the processing device that the first data type is not the same as the second data type, the retrieved data to create reformatted data having the second data type, the second data type comprising a second pointer to a second data format processor of the plurality of data format processors for creating the reformatted data in the second data type from the data in the standard format; and sending, by the processing device, the reformatted data to the client in response to the data request, such that it appears to the client that the value of the data attribute having the second data type exists in the data storage.

10. The method of claim 9 wherein one of the first and second data types is compressed and the other one of the first and second data types is uncompressed.

11. The method of claim 9 wherein one of the first and second data types is encrypted and the other one of the first and second data types is plaintext.

12. The method of claim 9 wherein the data request includes an indication of the second data type.

13. The method of claim 12 wherein the first data type is compressed with a first type of compression, and the second data type is compressed with a second type of compression.

14. The method of claim 12 wherein the first data type is encrypted with a first type of encryption, and the second data type is encrypted with a second type of encryption.

15. The method of claim 12 wherein the first data type is expressed in a first language, and the second data type is expressed in a second language.

16. The method of claim 9 wherein the second data type is a default data type when the data request does not indicate a data type.

17. An article of manufacture comprising a machine-accessible storage medium including data that, when accessed by a machine, causes the machine to perform a method comprising:

storing, in a data storage, a Lightweight Directory Access Protocol (LDAP) data repository that stores a single copy of a value for a data attribute, the value being associated with a subtype identifier that indicates a value of the data attribute being stored with a first data type that belongs to one of a plurality of classes of data types including encryption, compression, and language, other variants of the data attribute being dynamically built in response to one or more requests to produce values associated with data types that are different from the first data type and belong to a same class as the first data type;

receiving a data request from a client for the value of the data attribute having a second data type, the data request compliant with the LDAP;

retrieving the value of the data attribute having the first data type in response to the data request, the first data type comprising a first pointer to a first data format processor for creating data in a standard format from the data retrieved, wherein the first data format processor is one of a plurality of data format processors in a reformatter that each provide data translations for the plurality of classes of data types including encryption, compression, and language;

reformatting, in response to a determination that the first data type is not the same as the second data type, the retrieved data to create reformatted data having a second data type, the second data type comprising a second pointer to a second data format processor of the plurality of data format processors for creating the reformatted data in the second data type from the data in the standard format; and sending the reformatted data to the client in response to the data request, such that it appears to the client that the value of the data attribute having the second data type exists in the data storage.

18. The article of manufacture of claim 17 wherein one of the first and second data types is compressed and the other one of the first and second data types is uncompressed.

19. The article of manufacture of claim 17 wherein one of the first and second data types is encrypted and the other one of the first and second data types is plaintext.

20. The article of manufacture of claim 17 wherein the data request includes an indication of the second data type.

21. The article of manufacture of claim 20 wherein the first data type is compressed with a first type of compression, and the second data type is compressed with a second type of compression.

22. The article of manufacture of claim 20 wherein the first data type is encrypted with a first type of encryption, and the second data type is encrypted with a second type of encryption.

23. The article of manufacture of claim 20 wherein the first data type is expressed in a first language, and the second data type is expressed in a second language.

24. The article of manufacture of claim 17 wherein the second data type is a default data type when the data request does not indicate a data type.

* * * * *